Dec. 25, 1962  J. DEPALLENS  3,070,193
FRICTION-OPERATED SHOCK ABSORBER FOR VEHICLE SUSPENSIONS
Filed May 15, 1961
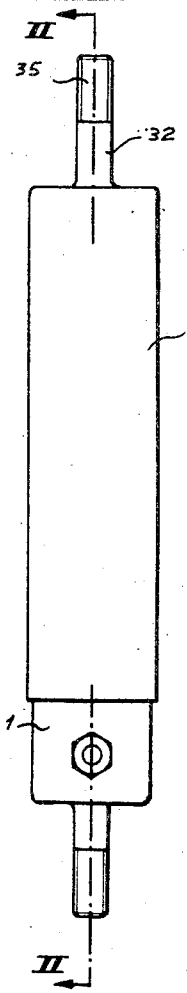
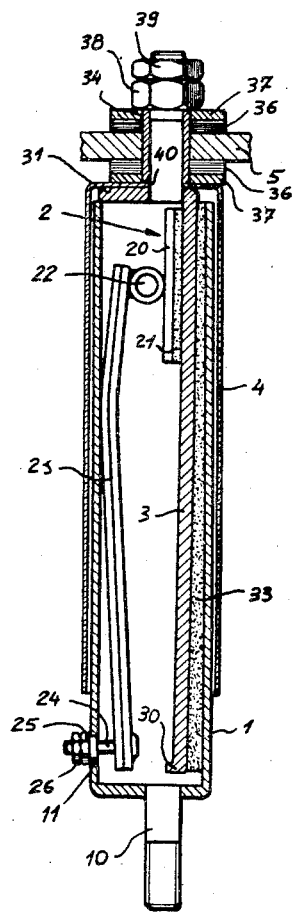
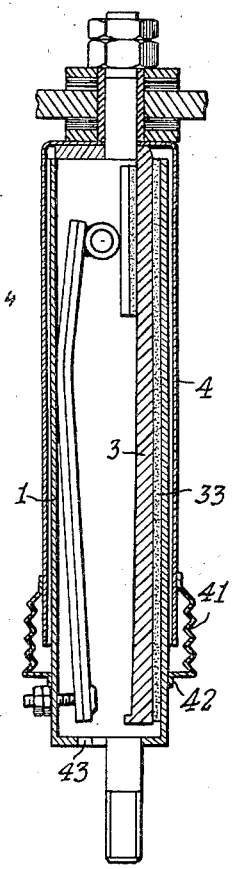

U̶n̶i̶t̶e̶d̶ ̶S̶t̶a̶t̶e̶s̶ ̶P̶a̶t̶e̶n̶t̶ ̶O̶f̶f̶i̶c̶e̶

3,070,193
Patented Dec. 25, 1962

1

3,070,193
FRICTION-OPERATED SHOCK ABSORBER FOR VEHICLE SUSPENSIONS
Jules Depallens, 1 Rue des Deux-Ponts,
Pully, Switzerland
Filed May 15, 1961, Ser. No. 109,986
Claims priority, application Switzerland Oct. 5, 1960
11 Claims. (Cl. 188—129)

My invention has for its object a friction-operated shock absorber for vehicle suspensions comprising at least two elements adapted to be shifted with reference to each other and an auxiliary member, one of said two elements including a blade and the other a sheath inside which said blade is shiftable, while a first member of friction exerting material is inserted between said two elements and is secured to one of them, and a second member of friction-exerting material is fitted between one of said elements and the auxiliary member.

According to my invention, said auxiliary member is provided with means adapted to produce a clamping stress between the two elements, while the thickness of the system constituted by the friction-exerting material of the first member and by the element with which the latter is rigid, varies throughout the length of said system, this arrangement being such that the efficiency of the shock-absorber may increase as the blade moves of its sheath.

I have illustrated by way of example in the accompanying drawings a preferred embodiment of my invention. In said drawings:

FIG. 1 is an outer view of said embodiment,
FIG. 2 is a cross section through line II—II of FIG. 1.
FIG. 3 is a cross-section of a modification of said shock absorber of my invention.

The damping system illustrated includes a sheath 1 constituted by a tubular member of a square transverse cross section open at one end and provided at its other end with a securing rod 10. An opening 11 is provided in one of its sides.

Inside the sheath 1 is positioned an auxiliary member formed by a shoe 20 and provided on one side with a lining 21 of a friction-exerting material, while its other surface is pivotally secured at 22 to an elastic rod 23. The latter is constituted by one or more superposed bent spring blades, which blades are designed so as to form a lever the pivot of which registers with the point of contact between the rod and the inner surface of the sheath 1. The position of the rod and consequently the clamping stress exerted on the shoe, is adjusted by a bolt 24 secured to the outer end of the rod 23 and screwed inside a nut 25 provided with a polygonal head associated with a cylindrical body, the height of which is at least equal to the thickness of the sheath inside the opening 11 of which it is housed. Said cylindrical body is adapted to transmit to said sheath the longitudinal stress exerted by the friction provided by the shoe, whereby a tractional stress is exerted on the elastic blade 23. The nut 25 engages furthermore the outer surface of the sheath through its polygonal head and a safety nut 26 ensures the locking of the nut 23 on the bolt 24.

The lining 21 of the shoe 20 is urged against a blade 3 of a uniform thickness, extending into the sheath 1 inside which it is adapted to slide. Said blade is provided at one end with an abutment 30 adapted to engage the lining 21 when a predetermined shifting of the blade has been obtained in the inward direction producing an increase in the clamping action, said abutment preventing the movement of the blade 3 out of the sheath 1. The blade is bent at its upper end 31 and is secured to a carrier rod 32. A lining 33 of friction-exerting material is inserted between the surface of the blade 3 facing away from the surface in contact with the lining 31 and the inner surface of the sheath facing that engaged by the rod 23. Said lining 33 is rigid with the blade 3 and its thickness increases linearly between the upper and the lower end of said blade 3.

According to a modification illustrated by FIG. 3, the lining 33 may be given a uniform thickness, while the thickness of the blade 3 increases according to a linear law when considered from its upper end towards its lower end. A closing cover 4 constituted by a tubular member having a square cross-section, open at one end, is rigid with the blade 3 and encloses the sheath 1, so as to protect the operative parts of the shock absorbed against dust, water and the like particles which are liable to prevent its proper operation. Said cover is secured to the rod 32 through the engagement of the latter inside the opening 40 provided to this end in the upper section of the cover.

Referring to FIG. 3, when the vehicle on which this shock absorber is to be fitted runs over particularly sandy grounds, it is possible, in accordance with a modification, to complete the protection ensured by the cover 4 by associating the latter with an elastic outer sheath 41. Said sheath 41 of the accordion or Sylphon type has a square cross-section and is fluidtightly secured respectively to the lower end of the cover 4 and to the sheath 1 at 42. The elastic sheath cover 41 should obviously be secured on the inner side of the bolt 24 to leave the latter free and to allow an adjustment of the elastic rod 23 without it being necessary to dismantle the shock absorber. An air valve 43 should be arranged in the uncovered or bare surface of the sheath 1, so as to provide equilibrium for the pressure inside the shock absorber.

The shock absorber is secured at one end to the vehicle chassis, of which a fragment is shown at 5, through the rod 32 which latter extends inside a tubular element 32 of plastic material and is provided at its end with a thread 35. Washers of rubber and metal, respectively 36 and 37 are arranged to either side of said chassis fragment 5 and are clamped over the latter by means of cooperating nut 38 and 39.

The other end of the shock absorber is secured to the lower end of the suspension carrying the vehicle, which is not illustrated, through the rod 10 with which is associated an arrangement formed by parts identical with those which serve for securing the shock absorber to the chassis.

The operation of the shock absorber as applied to the suspension of an automobile vehicle, is as follows:

When an unevenness on the road over which the vehicle runs, produces a compression of the suspension springs, the blade 3 and its lining 33 enter further inside the sheath 1. When the unevenness on the road has been passed, the suspension springs of the vehicle have a tendency to return into their position of equilibrium after executing a series of oscillations the amplitude of which decreases. To obtain a proper road behaviour and a sufficient comfort for the passengers, such oscillations should be of a short duration and of a reduced amplitude.

The blade 3 moves alternatingly inwardly and outwardly of the sheath until the friction forces produced by the lining hold it finally fast in a position of equilibrium. A mathematical analysis of the movement shows the law of vertical acceleration of the vehicle is similar in absolute value with that of the axial movement. Consequently, to the extreme positions obtained by such a movement, there correspond extreme values of acceleration and, consequently, of the force with which the vehicle bodywork is urged vertically in both directions. Said forces produce at the moment at which the direction of movement changes a shock which is, of course, all the more violent when the acceleration is larger.

The outline provided for the lining 33 of the blade 3 allows reducing said detrimental action and leads to a speedy damping of the oscillations. As a matter of fact, as the blade 3 moves out of its sheath 1, the shoe 20 moves always further away from said blade by reason of the increase in the thickness of the blade and lining system. The blades forming the rod 23 which are urged thus towards the cooperating wall of the sheath engage always with an increasing pressure the shoe 20. The frictional stress between the lining 31 and the blade 3 and between the lining 33 and the cooperating side of the sheath, increases when the blade moves outwardly of the sheath, whereby a speedy damping of the oscillations is obtained.

What I claim is:

1. A friction-operated shock absorber for association with two relatively movable members having a spring suspension therebetween said shock absorber comprising: a sheath having opposing parallel walls and oppositely disposed ends, one of said ends being closed and the other open, said closed end including means for attachment to one of said relatively movable members; a blade extending telescopically into said sheath through said open end and adjacent one of said sheath walls, said blade having means at its outer end for attaching to the other of the relatively movable member; a cover enclosing the open end of said sheath and extending over said blade; a first friction lining mounted between said blade and the adjacent one of said sheath walls and attached to one of them, said blade and first frictional lining in combination being progressively thicker from said outer end of said blade to its other end; and an auxiliary member comprising an elastic rod having oppositely disposed ends, rod attaching means for fastening said rod by one end in said sheath adjacent its closed end and to the wall opposing the adjacent one of said sheath walls, said rod adjacent its other end having a bent portion engaging said opposing wall and extending toward the adjacent one of said sheath walls, a platen attached to the other end of said rod, a second frictional lining fastened to said platen facing said blade, said platen and attached friction lining being springily biased by said bent elastic rod against said blade to press said blade and first friction lining against the adjacent one of said sheath walls, the pressure biasing exerted by said rod and platen being progressively increased as said blade and sheath telescope relatively outward to bring the progressively thicker other end of said combination of blade and first lining toward said platen and second lining, whereby the shock absorbing capacity of said shock absorber is proportional to the telescoping of said blade and sheath and respectively attached relatively movable elements.

2. A friction-operated shock absorber as described in claim 1 characterized in that said rod attaching means includes adjusting means for changing the pressure biasing exerted by said rod, thereby permitting adjustment of the shock absorbing capacity of said shock absorber.

3. A friction-operated shock absorber as described in claim 2 characterized in that said adjusting means comprises: a bolt extending transversely through the fastened end of said rod; a nut having a cylindrical section complementary to a corresponding opening in the sheath and a polygonal head which engages the end of said bolt outside the sheath, whereby when the nut is turned the fastened end of said rod is moved transversely in said sheath to change the biasing pressure exerted by said rod on the platen and blade.

4. A friction-operated shock absorber as described in claim 1 characterized in that the friction lining is connected firmly between the said shoe and the blade and to the shoe and extends for part of the blade length.

5. A friction-operated shock absorber as described in claim 1 characterized in that the connection between platen and curved elastic rod is flexible.

6. A friction-operated shock absorber as described in claim 1 characterized in that the blade is progressively thicker in the direction of its free end extending into the sheath, and the thickness of the frictional lining between blade and sheath is constant throughout the entire length.

7. A friction-operated shock absorber as described in claim 1 characterized in that the thickness of the frictional lining between blade and sheath progressively increases in direction of the blade end that extends into the sheath and the thickness of the blade is constant throughout the entire length.

8. A friction-operated shock absorber as described in claim 1 characterized in that the blade end opposite said outer end has an abutment which following a given movement of the blade telescoping outwardly from the sheath comes into contact with one edge of the platen and prevents the blade from coming out of the sheath.

9. A friction-operated shock absorber as described in claim 1 characterized in that said cover enclosing the open end of said sheath and extending over said blade is removably attached to the blade and extends short of said rod attaching means.

10. A friction-operated shock absorber as described in claim 9 characterized in that said cover includes an elastic Sylphon tube envelope that is attached to and extends between the sheath and rod attaching means, said rod attaching means being left unenclosed for adjustment.

11. A friction-operated shock absorber as described in claim 10 characterized in that the said sheath has an air intake.

References Cited in the file of this patent

UNITED STATES PATENTS

| | | |
|---|---|---|
| 1,263,469 | Reno | Apr. 23, 1918 |
| 2,703,156 | Depallens | Mar. 1, 1955 |

FOREIGN PATENTS

| | | |
|---|---|---|
| 1,101,872 | France | Apr. 27, 1955 |
| 195,880 | Great Britain | Apr. 12, 1923 |